United States Patent [19]

Ito

[11] Patent Number: 4,958,902
[45] Date of Patent: Sep. 25, 1990

[54] OPTICAL SPACE TRANSMISSION APPARATUS

[75] Inventor: Yujiro Ito, Tokyo, Japan
[73] Assignee: Sony Corporation, Tokyo, Japan
[21] Appl. No.: 269,661
[22] PCT Filed: Feb. 25, 1988
[86] PCT No.: PCT/JP88/00198
 § 371 Date: Oct. 25, 1988
 § 102(e) Date: Oct. 25, 1988
[87] PCT Pub. No.: WO88/06740
 PCT Pub. Date: Sep. 7, 1988

[30] Foreign Application Priority Data

Feb. 27, 1987 [JP] Japan .................................. 62-28483

[51] Int. Cl.⁵ .............................................. G02B 6/32
[52] U.S. Cl. ............................. 350/96.18; 350/96.15; 350/96.16; 350/96.25
[58] Field of Search ................. 350/96.1, 96.15, 96.16, 350/96.18, 96.24, 96.25, 96.26, 96.29, 327, 372

[56] References Cited

U.S. PATENT DOCUMENTS

| 3,449,036 | 6/1969 | Jacobsen | 350/96.18 |
| 4,021,099 | 5/1977 | Kawasaki et al. | 350/96.18 X |
| 4,154,529 | 5/1979 | Dyott | 356/28 |
| 4,367,040 | 1/1983 | Goto | 356/44 |
| 4,611,884 | 9/1986 | Roberts | 350/96.15 |
| 4,750,802 | 6/1988 | Bhagavatula | 350/96.15 |

FOREIGN PATENT DOCUMENTS

| 51-15452 | 2/1976 | Japan . |
| 53-45249 | 4/1978 | Japan . |
| 53-60683 | 5/1978 | Japan . |
| 57-27216 | 2/1982 | Japan . |
| 2011610 | 11/1978 | United Kingdom . |

Primary Examiner—Frank Gonzalez
Attorney, Agent, or Firm—Philip M. Shaw, Jr.

[57] ABSTRACT

An optical space transmission apparatus for use in conjunction with an optical space transmission line (8) for carrying transmission light and reception light comprising an information transmission light emitting element (5) for generating transmission light, an optical transmission system (6,7) including an optical transmission fiber (7), an information reception light receiving element (9) for detecting reception light, an optical reception system (4), and a transmission/reception common lens (3) which is optically coupled to said optical space transmission line (8), characterized in that an end portion (7a) of said optical transmission fiber (7) is positioned near the focal plane of said transmission/reception common lens (3) and near, or on its optical axis, the transmission light emitting from said information transmission light emitting element (5) is transmitted into the optical space transmission line (8) through said optical transmission system (6,7) and through said transmission/reception common lens (3), and the reception light, carried by said optical space transmission line (8) is introduced into said information reception light receiving element (9) through said transmission/reception common lens (3) and through said optical reception system (4), whereby the transmission light and the reception light are spatially split near the end portion (7a) of said optical transmission fiber (7) which is closest to the transmission/reception common lens (3).

7 Claims, 4 Drawing Sheets

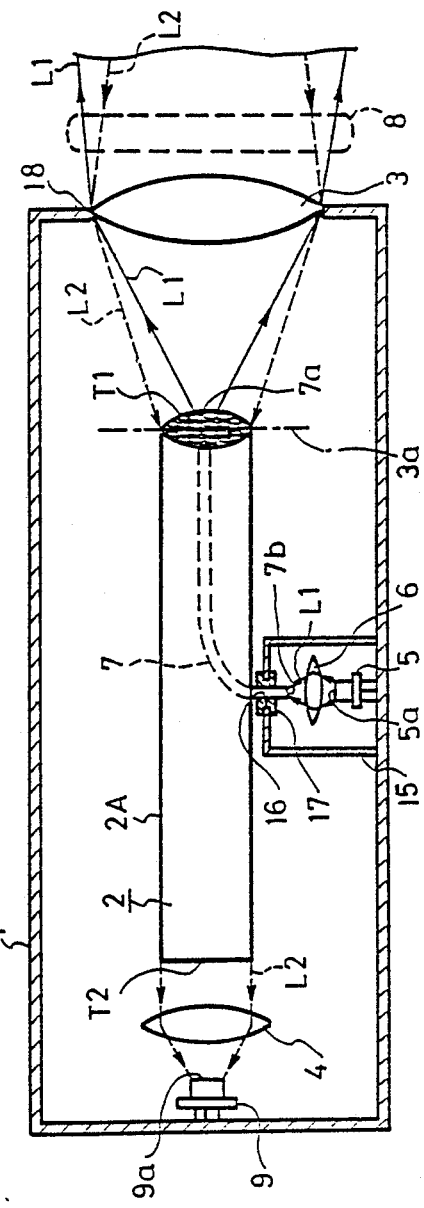
F I G. 2

OPTICAL SPACE TRANSMISSION APPARATUS

TECHNICAL FIELD

The present invention relates to an optical space transmission apparatus which uses a common optical space transmission line to transmit and receive an optical information.

BACKGROUND ART

As an optical space transmission apparatus for performing optical telecommunication between two points separated remotely, there is known a parallel 2-axis type one in which an optical transmission system and an optical reception system are provided respectively and mirror cylinders respectively incorporating the optical transmission system and the optical reception system are provided in parallel to each other. This apparatus becomes large in size, and requires adjusting means for adjusting parallelism between both of the mirror cylinders so that the apparatus becomes complicated in structure.

Accordingly, if the optical transmission system and the optical reception system are formed as a coaxial type, the above-mentioned problems can be solved.

A comparative example of an optical space transmission apparatus of coaxial type will be described next with reference to FIG. 1. Reference numeral 1 designates a mirror cylinder which incorpotates therein an optical information transmission light emitting element 5, an optical information reception light receiving element 9 and a half mirror 10 which separates transmission and reception lights. Also, a transmission/reception common lens 3 is mounted to the opening of the mirror cylinder 1.

A diverging transmission light L1 from the light emitting element 5 is introduced through the half mirror 10 to the transmission/reception common lens 3. The substantially parallel transmission light L1 therefrom is transmitted to an optical space transmission line 8, then transmitted therefrom and received by an optical space transmission apparatus at the reception side.

A substantially parallel reception light L2 transmitted from the apparatus at the reception side through the optical space transmission line 8 is introduced into the transmission/reception common lens 3. A converged reception light L2 therefrom is reflected by the half mirror 10 and then introduced into the light receiving element 9. The reception light L2 incident on the light receiving element 9 is therein converted into an electrical signal.

In the optical space transmission apparatus shown in FIG. 1, however, the transmission light L1 and the reception light L2 are both lost by the insertion loss of the half mirror 10 and S/N ratio of the transmission light L1 and the reception light L2 is lowered by a stray light produced by the half mirror 10 within the mirror cylinder 1, thus making it impossible to perform the long-distance communication.

In view of the above aspect, the present invention is to provide an optical space transmission apparatus of simple construction which can improve transmission efficiency and S/N ratio of both the transmission and reception lights.

DISCLOSURE OF INVENTION

The present invention relates to an optical space transmission apparatus which comprises an information transmission light emitting element, an optical transmission system including an optical transmission fiber, an information reception light receiving element, an optical reception system, a transmission/reception common lens, in which an end portion of the optical transmission fiber is positioned near the focal plane of the transmission/reception common lens and near the optical axis of this lens and in which the transmission light emitted from the information transmission light emitting element is transmitted into an optical space transmission line through the optical transmission system and through the transmission/reception common lens while the reception light transmitted through the optical space transmission line is introduced into the information reception light receiving element through the transmission/reception common lens and through the optical reception system, whereby the transmission light and the reception light are spatially separated near the end portion of the optical transmission fiber.

BRIEF DESCRIPTION OF DRAWINGS

FIG. 2 is a diagram showing a first embodiment of an optical space transmission apparatus according to the present invention.

BEST MODE FOR CARRYING OUT THE INVENTION

Figure 1:
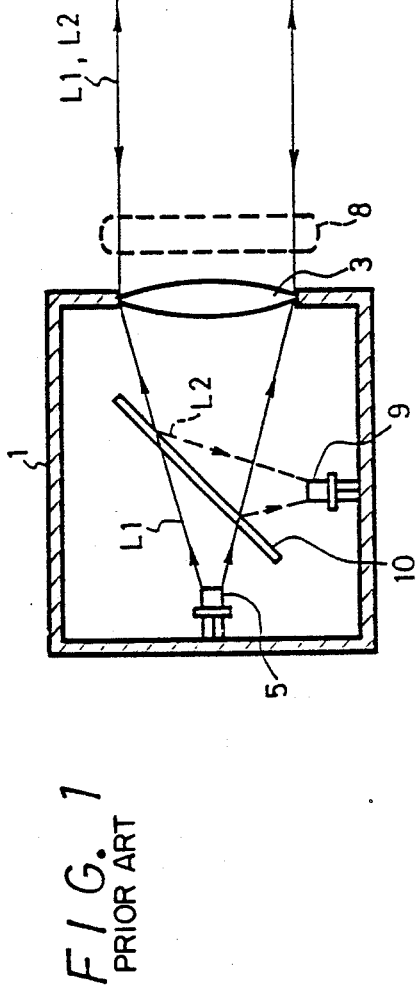
FIG. 1 is a diagram showing a comparative example of an optical space transmission apparatus.

A first embodiment of an optical space transmission apparatus (coaxial-type optical space transmission apparatus and this is also true for second to fourth embodiments) will hereinafter be described with reference to FIG. 2. Reference numeral 1 designates a mirror cylinder which has the following optical elements incorporated therein and mounted on the opening thereof. Reference numeral 5 designates an optical information transmission light emitting element, e.g., laser diode which is mounted on the lower surface of the mirror cylinder 1 and which is also incorporated within a sealed casing 15. A transmission light L1 from the light emitting element 5 is a desired one such as a visible light, an infrared light and so on. Reference numeral 6 designates a transmission lens such as a convex lens for converging the diverged transmission light L1 from the light emitting element 5 and this lens is similarly incorporated within the sealed casing 15. Reference numeral 9 designates an optical information reception light receiving element such as a photo diode mounted on one end face or the mirror cylinder 1. Reference numeral 4 designates a light receiving lens such as a convex lens which converges a reception light to become incident on the light receiving element 9.

Reference numeral 3 designates a transmission/reception common lens such as a convex lens. As this lens, there is employed an aspherical lens (for example, diameter is 150 mm and focal length is 250 mm) of large aperture with small spherical aberration. This transmission/reception common lens 3 is attached to an opening 18 bored through the other end face of the mirror cylinder 1. Reference numeral 2 designates a transmission/reception light splitter which is formed of a bundle 2A having a diameter of, for example, about 2 mm formed of a plurality of thin optical fibers having a diameter of, for example, about 0.1 mm. Both end faces T1 and T2 of the bundle 2A form planes which are perpendicular to the axial direction thereof. Reference numeral 7 designates an optical transmission element which is an optical fiber used to introduce the transmission light from the light emitting element 5 to the transmission/reception common lens 3. The transmission/reception common lens 3 is opposed to one end face of the bundle 2A, i.e., the optical space transmission line side end face T1, and the end face T1 of the bundle 2A is positioned within or near the focal plane 3a of the lens 3 and on or near the optical axis of the lens 3. One end face 7a is positioned on the end face T1 of this bundle 2A at its substantially central position. One end of the optical transmission fiber 7 is bundled along substantially the center so as to form a part of the bundle 2A, and the other end portion thereof is pulled out from the bundle 2A and is also introduced through an opening 16 formed through the sealed casing 15 into its inside. The other end face 7b thereof is opposed to the transmission lens 16. A rubber packing 17 is attached to the opening 16 in order to prevent, of the transmission light L1 from the light emitting element 5, the lights other than the light incident on the optical transmission fiber 7 from leaking out through the sealed casing 15. The other end face T2 of the bundle 2A is opposed to the reception lens 4.

The operation of the optical space transmission apparatus will be described next. The transmission light (diverged light) L1 from the light emitting surface 5a of the optical information transmission light emitting element 5 is converged by the transmission lens 6 to be introduced into the other end face 7b of the optical transmission fiber 7, whereby it is introduced into one end face 7a with low loss and emitted from its one end, i.e., substantially the center of the optical space transmission line side end face T1 of the bundle 2A so as to be diverged toward the transmission/reception common lens 3. The thus diverged transmission light L1 is substantially collimated by the transmission/reception common lens 3 and emitted to the optical space transmission line 8 for transmission, while it is received by the optical space transmission apparatus at the reception side.

A reception light L2 of substantially collimated light transmitted from the optical space transmission apparatus at the reception side and travelling through the optical space transmission line 8 is introduced into the transmission/reception common lens 3, wherein it is converged and introduced into the bundle 2A so as to be substantially focused on the focal plane 3a of the lens 3, i.e., the optical space transmission line side end face T1 of the bundle 2A and then guided by the bundle 2A. The thus diverged reception light L2 emitted from the light receiving element side end face T2 of the bundle 2A is introduced into the reception lens 4, and the converged reception light L2 therefrom is introduced into the light receiving element 9 so as to be focused on its light receiving surface 9a. The reception light L2 introduced into the light receiving element 9 is therein converted into an electrical signal.

The transmission/reception common lens 3 has more or less aberration (spherical aberration) in practice, and in that case, the following problem occurs. This will be described with reference to FIGS. 3 and 4. Considering the aberration of this lens 3, the converging reception light L2 emitted from the lens 3 and travelling toward the bundle 2A is introduced into the bundle 2A so as to form a relatively large beam spot on the end face T1.

Figure 3:
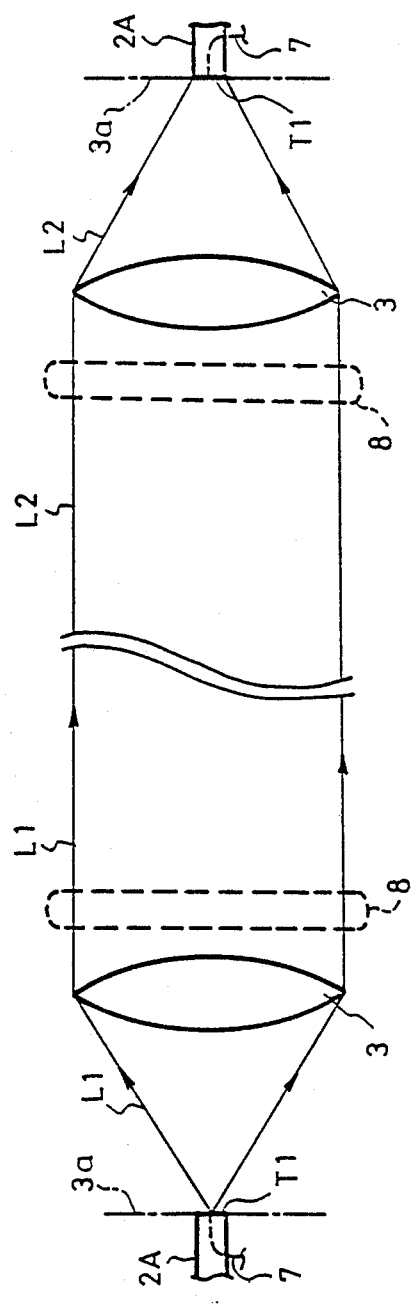
FIG. 3 is a diagram used to explain a way of how the optical space transmission apparatus of FIG. 2 transmits a light.

In FIG. 3, the left side represents one optical space transmission apparatus (transmission side), while the right side represents the other optical space transmission apparatus (reception side). A transmission light is emitted from the center (end face 7a of the optical transmission fiber 7) of the end face T1 of the bundle 2A of the left optical space transmission apparatus to be diverged and introduced into the transmission/reception common lens 3. The substantially parallel transmission light L1 emitted therefrom is transmitted through the optical space transmission line 8 and then introduced into the right optical space transmission apparatus as the reception light L2. The reception light L2 incident on the transmission/reception common lens 3 of the right optical space transmission apparatus is thereby converged and then introduced into the end face T1 of the bundle A2. In this case, a beam spot focused on the focal plane 3a of each of the transmission/reception common lens 3 of the left and right optical space transmission apparatus is presented as a circle of confusion of a relatively large area.

Figure 4:
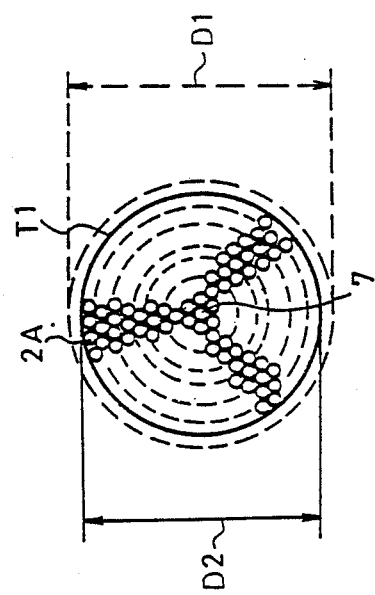
FIG. 4 is an end view of a bundle of the optical space transmission apparatus of FIG. 2.

Accordingly, if both of the transmission/reception common lens 3 and the bundle 2A are selected in such a manner that as shown in FIG. 4 the diameter D1 of the least circle of confusion formed by the transmission/reception common lens 3 and the diameter D2 of the effective light receiving surface of the bundle 2A become substantially equal to each other, the reception light L2 introduced into the transmission/reception common lens 3 can be effectively introduced into the light receiving element 9.

According to the above-mentioned optical space transmission apparatus, the tranmission/reception common lens 3 can be used common to the transmission light L1 and the reception light L2, thus making the apparatus simple in arrangement. In addition, even when the lens 3 is used common to the transmission and the reception, a light loss produced by the separated optical axes is very small. Further, the reception light L2 can be effectively introduced into the light receiving element 9 by the transmission and reception light splitter 2 formed of the bundle 2A of the optical fibers. Furthermore, the transmission light L2 can be effectively transmitted into the optical transmission line 8 by the optical fiber 7 which is partially formed as one body with the bundle 2A and the light emitting element 5 and the light receiving element 9 can be located with an increased freedom so that the S/N ratio of the transmission light L1 and the reception light L2 can be prevented from being lowered by the stray light owing to the mutual shielding of light. In addition, the optical axis of the received light has a certain cross section area as the bundle 2A of the optical fiber, so that even when a cheap transmission/reception common lens 3 having a not so small spherical aberration so as to cause the least circle of confusion of a light focused by the transmission/reception common lens 3 to become substantially equal to the cross section area of the bundle 2A, the light receiving efficiency of the reception light L2 can be increased.

In this embodiment, an extremely small portion of the transmission light L1 is reflected by the transmission/reception common lens 3 and there is then a risk that the reflected light will cause a stray light to be produced within the mirror cylinder 1. This stray light is considerably small as compared to the stray light produced when the half mirror is used as shown in FIG. 1. Besides, in this embodiment, of the stray lights produced within the mirror cylinder 1, very few are introduced into the bundle 2A. Further, if the transmission/reception common lens 3 is coated with a non-reflection coating material, the stray light can be decreased to be less than 1% of that of the case where the lens is not coated with the non-reflection coating material. Thus, the stray light can be decreased more. Therefore, this embodiment is substantially free from the stray light.

It is possible to use one or more than two optical transmission fibers 7 positioned at substantially the center of the bundle 2A. In that case, one light emitting element may be provided for each optical fiber.

Furthermore, since the cross-sectional area of the optical transmission fiber 7 is substantially about 1/400 of the cross-sectional area of the bundle 2A, the amount of light in which the reception light L2 is disturbed by the optical transmission fiber 7 is very small.

Though the optical space transmission apparatus has the above-mentioned advantages, it has the following defects. That is, the optical transmission fiber 7 forming a part of the bundle 2A of the optical fibers constructing the transmission and reception light splitter 2 has to be separated and led to the outside so that the manufacturing work thereof becomes cumbersome. Also, the transmission and reception light splitter 2 becomes complicated in shape, resulting in a cumbersome assembling work of the apparatus and a cumbersome maintenance work thereof.

Figure 5:
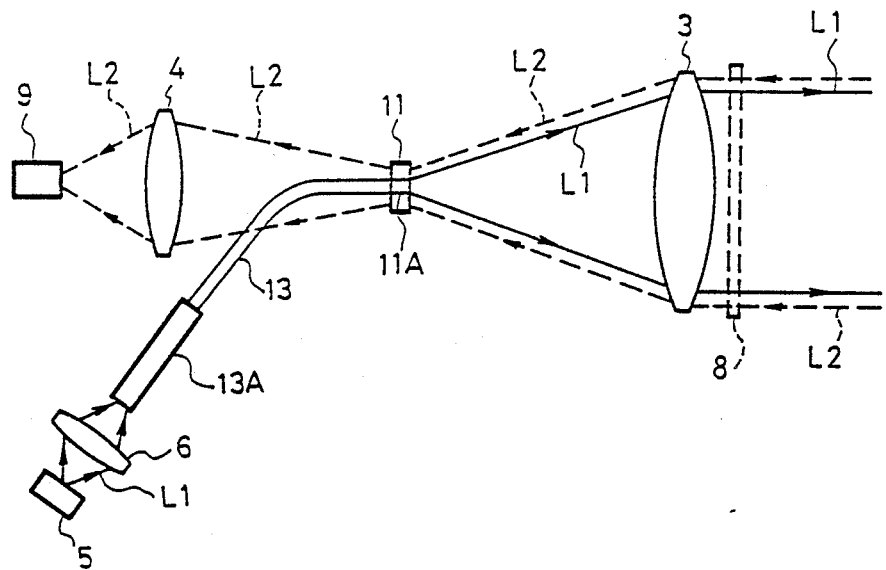
FIG. 5 is a diagram showing a second embodiment of the optical space transmission apparatus according to the present invention.

A second embodiment, which can overcome these defects, will be described with reference to FIG. 5. In FIG. 5, like parts corresponding to those of FIG. 2 are marked with the same references and the overlapping explanation therefor will be omitted. Further, the mirror cylinder which incorporates therein the optical system will not be shown and described. Reference numeral 11 designates an optically transparent plate which is used to split the transmission light and the reception light and is positioned on the same optical axis of the transmission/reception common lens (for example, diameter is 145 mm) 3 and the reception lens 4 and within the focal plane remote from the transmission/reception common lens 3 by the distance of about 100 mm to 300 mm.

This transparent plate 11 has a through-hole 11A bored through its center, and one end of an optical transmission fiber 13 is engaged into the through-hole 11A and supported therein. The optical transmission fiber 13 is pulled to the outside so as to cross the optical path along which the reception light L2 travelling through the transparent plate 11 travels toward the reception lens 4. Reference numeral 13A designates a protective film of the optical transmission fiber 13. This protective film is removed from the optical transmission fiber at its portion crossing the optical path through which the reception light L2 passes to make its outer diameter thin so that the travel of the reception light L2 is not disturbed as much as possible. In this connection, while the diameter of the beam spot of the reception light L2 incident on the transparent plate 11 is about 1 mm, the outer diameter of the protective film 13A of the optical transmission fiber 13 is 0.9 mm and the outer diameter of the cladding portion is 0.125 mm. Thus, when the protective film 13A is removed from the optical transmission fiber 13, the efficiency with which the reception light L2 is introducd into the light receiving element 9 can be increased considerably.

The operation of this optical space transmission apparatus will be described subsequently. The transmission light (diverging light) L1 from the optical information light emitting element 5 is converged by the transmission lens 6, introduced into the other end face of the optical transmission fiber 13 and then emitted from its one end face, i.e., the transparent plate 11 toward the transmission/reception common lens 3 in a diverging fashion. The thus diverged transmission light L1 is substantially collimated by the transmission/reception common lens 3, transmitted to the optical space transmission line 8 and received by the optical space transmission apparatus at the reception side.

The substantially parallel reception light L2 transmitted from the optical space transmission apparatus at the reception side and transmitted through the optical space transmission line 8 is introduced into the transmission/reception common lens 3, in which it is converged, focused on the transparent plate 11 and then diverged. The thus diverged reception light L2 is introduced into the reception lens 4, in which it is converged and then introduced into the light receiving element 9 so as to be focused thereon. The reception light L2 incident on the light receiving element 9 is therein converted into an electrical signal.

According to the above optical space transmission apparatus, the transmission/reception common lens 3 can be used common to the transmission light L1 and the reception light L2 so that the apparatus can be simplified in arrangement. Besides, even though the transmission/reception common lens 3 is used common, a light loss produced when the optical axes are separated is very small. Further, since the light emitting element 5 and the light receiving element 9 can be positioned with a large freedom, the mutual light-shielding effect can prevent the S/N ratio of the transmission light L1 and the reception light L2 from being lowered by the stray light. Since the transmission light and the reception light are splitted by the transparent plate 11, the arrangement of the apparatus can be simplified more, and the assembly work of the apparatus and the maintenance work thereof can be performed with greater ease. Furthermore, the reception light L2 can be effectively introduced into the light receiving element 9 by the transparent plate 11. In addition, the transmission light L2 can be effectively transmitted into the optical space transmission line 8 by means of the optical transmission fiber 13 engaged into the through-hole 11A of the transparent plate 11.

Figure 6:
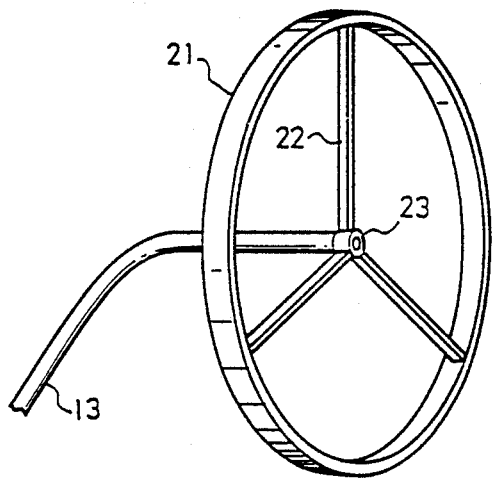
FIG. 6 is a perspective view illustrating a part of a supporting member of a third embodiment of the optical space transmission apparatus according to the present invention and FIG. 7 is a diagram showing the location of a fourth embodiment of the optical space transmission apparatus according to the present invention.

While in the optical space transmission apparatus of FIG. 5 the optical transmission fiber 13 is engaged with the through-hole 11A of the transparent plate 11 and then supported thereby, such a variation is possible in which the transparent plate 11 as the supporting member in FIG. 5 is replaced with a circular ring 21 on which are formed three transparent or opaque support members 22 extending toward the central portion of the circular ring, an engaging portion 23 is formed at an intersection portion thereof and the end portion of the optical transmission fiber 13 is engaged with the engaging portion 23 and then supported thereby as in a third embodiment shown in FIG. 6. The supporting member of any shape and structure may be used if only it can secure the end portion of the optical transmission fiber 13 at a predetermined position.

In the optical space transmission apparatus of FIG. 5 (also in FIG. 2), if the transmission light L1 from the light emitting element 5 is introduced into the optical transmission fiber 13 with sufficient energy, the transmission lens 6 may be omitted.

The respective embodiments of FIGS. 2, 5 and 6 have the following problems. That is, in order to transmit the transmission light L1 as distant as possible, the parallelism of the transmission light L1 emitted from the transmission/reception common lens 3 must be made high. To this end, as described above, the transmission/reception common lens 3 must be formed of, for example, the aspherical lens to reduce the spherical aberration with the result that the parallel reception light L2 introduced into the transmission/reception common lens 3 from the optical space transmission line 8 is focused to form a very small beam spot. By the light splitter 2 in FIG. 2 or the transparent plate 11 in FIG. 5, in order to effectively introduce the reception light L2 into the light receiving element 9, the NA of the transmission/reception common lens 3 must be reduced as much as possible thereby to make the reception light L1 form a beam spot as large as possible on its focal point such that the reception light L2 must be protected from the end portion of the optical transmission fiber 7 or 13. However, this increases the length of the optical path of the optical system through which the reception light L1 passes and makes the apparatus large in size.

Figure 7:
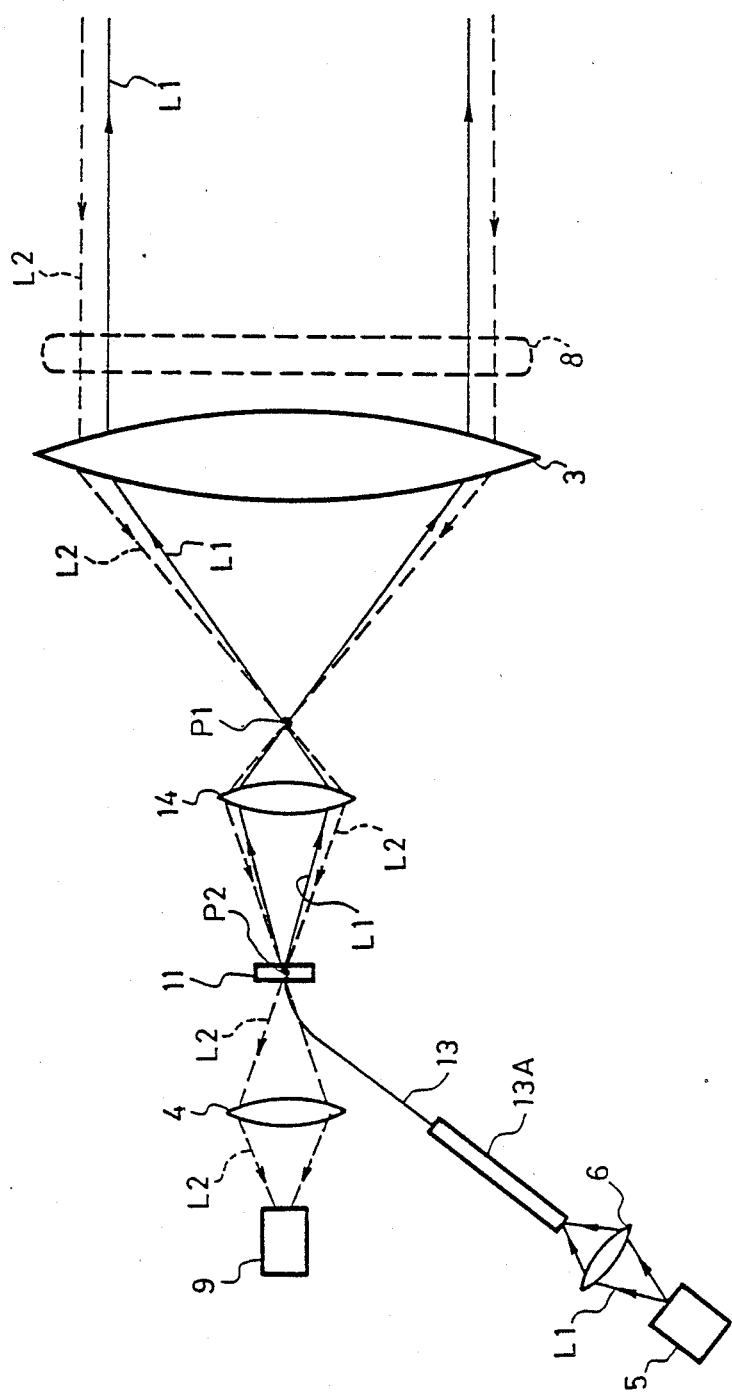

A fourth embodiment which can improve these shortcomings will be described with reference to FIG. 7. In FIG. 7, like parts corresponding to those of FIG. 5 are marked with the same references and the overlapping explanation therefor will be omitted. The mirror cylinder in which the optical system is accommodated is not shown and described. The optical space transmission apparatus in FIG. 7 is different from the optical space transmission apparatus in FIG. 5 in that a convex lens 14 is positioned between the transmission/reception common lens 3 and the transparent plate 11. Each of the transmission/reception common lens (diameter is 145 mm) 3 and the lens 14 is the aspherical lens having a small spherical aberration. The transmission/reception common lens 3, the lens 14, the transparent plate 11 and the reception lens 4 are positioned with their optical axes coincident. The lens 14 is used to form a conjugate point P2 of a focal point P1 of the transmission/reception common lens 3, and the transparent plate 11 is positioned at this conjugate point P2. The lenses 3 and 14 constitute a transmission/reception common lens formed of a compound lens.

Further, the location of the lens 14 is determined such that the size (for example, the diameter thereof is about 400 $\mu$m) of the beam spot of the reception light L2 at the conjugate point P2 may become larger than the size (for example, the diameter thereof is about 100 $\mu$m) of the beam spot of the reception light L2 at the focal point P1. In this case, the NA (numerical aperture) of the transmission/reception common lens 3 is presented as 0.4 (=refractive index$\times$sin 23.6°) on the left side of the drawing so that the NA of the lens 14 is presented as 0.4 on the right side of the drawing, while the NA of the lens 14 is presented as 0.1 (=refractive index$\times$sin 5.7°) on the left side of the drawing.

Furthermore, the optical transmission fiber 13 which introduces the transmission light from the light emitting element 5 into the transparent plate 11 is a single mode fiber (diameter of core is 6 $\mu$m and NA is 0.1) and the diameter of the cladding portion is 125 $\mu$m in this embodiment. The end face of the optical transmission fiber at its portion where the protective film 13A is removed is bonded to the center of the transparent plate 11 at its side opposing the reception lens 4. In this case, as shown in FIG. 5, the end face of the optical transmission fiber may be engaged into a through-hole bored through the center of the transparent plate 11. The degree in which the reception light L2 is disturbed at the conjugate point P2 by the optical transmission fiber 13 is very small as is expressed as $$(125 \div 400)^2 = 0.097$$

This can be neglected in practice.

The operation of this optical space transmission apparatus will be described next. The transmission light (diverging light) L1 from the optical information transmission light emitting element 5 is converged by the transmission lens 6 and introduced into the other end face of the optical transmission fiber 13 to be guided. Then, this light is emitted from one end face thereof, i.e., the transparent plate 11 as a beam spot of a nearly point source and then is diverged toward the lens 14. The diverged transmission light L1 therefrom is converged by the lens 14, focused at the focal point P1 of the transmission/reception common lens 3, then diverged and introduced into the transmission/reception common lens 3, whereby it is collimated to substantially a parallel light and emitted to the optical space transmission line 8 to be transmitted. The thus transmitted light is received by the optical space transmission apparatus at the reception side.

Further, the reception light L2 of substantially parallel light transmitted from the optical space transmission apparatus at the reception side and travelling through the optical space transmission line 8 is introduced into the transmission/reception common lens 3, in which it is converged, focused at the focal point P1 and then diverged to be introduced into the lens 14. The converged reception light L2 from the lens 14 is focused on the conjugate point P2, i.e., the transparent plate 11 so as to enclose the beam spot of the transmission light L2 emitted from the optical fiber 13 and then diverged. This diverged reception light L2 is made incident on the reception lens 4, converged thereby and then introduced to the light receiving element 9 to be focussed thereon. Then, the reception light L2 introduced into the light receiving element 9 is therein converted into a electrical signal.

According to the above-mentioned optical space transmission apparatus, the transmission/reception common lens 3 can be made common to the transmission light L1 and the reception light L2 so that the apparatus can be simplified in arrangement. Besides, though the lens 3 is used common to the light transmission and the light reception, a light loss caused when the optical axes are separated is very small. Also, since the light emitting element 5 and the light receiving element 9 are located with a large freedom, the mutual light-shielding effect can prevent the S/N ratio of the transmission light L1 and the reception light L2 from being lowered by the stray light. Further, since the transmission light and the reception light are splitted by the transparent plate 11, the apparatus can be simplified in arrangement and the assembly work of the apparatus and the maintenance work thereof can be performed with ease.

Furthermore, since the lens 14 is provided to form the conjugate point P2 of the focal point P1 of the transmission/reception common lens 3, the apparatus of this embodiment has the following advantages. That is, in order to transmit the transmission light L1 as distant as possible, the parallelism of the light emitted from the transmission/reception common lens 3 must be made high. To this end, the transmission/reception common lens 3 must be formed as, for example, the aspherical lens to reduce its spherical aberration. If so, the parallel reception light L2 introduced from the optical space transmission line 8 into the transmission/reception common lens 3 is focused at the focal point P1 so as to form a very small beam spot. Further, if a lens having a large NA is used as the transmission/reception common lens 3, its focal point P1 approaches the transmission/reception common lens 3 so that the apparatus can be made compact in size in practice. When the beam spot that the reception light L1 forms at the focal point P1 is enlarged by the lens 14 and formed on the transparent plate 11 which is used to split the transmission and reception lights, the reception light L2 can be effectively introduced into the light receiving element 9 by the transparent plate 11. Further, the transmission light L2 can be effectively transmitted into the optical space transmission line 8 by the optical transmission fiber 13 fixed to the transparent plate 11.

Furthermore, if the transmission light L1 from the light receiving element 5 is introduced into the optical transmission fiber 13 with a sufficient energy, the transmission lens 6 therefor may be omitted.

In addition, also in the embodiment of FIG. 7, the transparent plate 11 can be replaced with the supporting member shown in FIG. 6.

According to the present iunvention, as set forth above, it is possible to obtain the optical space transmission apparatus of simple arrangement which can increase the transmission efficiency and S/N ratio of the transmission light and the reception light.

I claim:

1. An optical space transmission apparatus for use in conjunction with an optical space transmission line over which light information signals can be sent or received, and being of the type which includes a light emitting element for generating light signals to be transmitted over the optical space transmission line, a light receiving element for detecting light received from the optical space transmission line, a transmission/reception common lens which is optically coupled to the optical space transmission line, and a transmission/reception light splitter optically connecting the transmission/reception common lens with the light emitting element and the light receiving element, wherein the improvement comprises that the transmission/reception light splitter includes at least one optical fiber and in that one end portion of the optical fiber is positioned near the focal plane of the transmission/reception common lens and near, or on its optical axis, and the other end of the optical fiber is optically coupled to the light emitting element whereby light transmitted or received by the apparatus is spatially split near the end portion of the optical fiber which is closest to the transmission/reception common lens.

2. An optical space transmission apparatus as recited in claim 1 wherein the transmission/reception light splitter includes a bundle of optical fibers, including the one optical fiber, and wherein the end of the one optical fiber which is proximal to the transmission/reception common lens is positioned at the center of the optical fiber bundle.

3. An optical space transmission apparatus as recited in claim 2 wherein the diameter of the effective light receiving end of the optical fiber bundle which is proximal to the transmission/reception common lens is chosen to be equal to the diameter of the least circle of confusion formed by a beam spot focused by the transmission/reception common lens on its focal plane.

4. An optical space transmission apparatus as recited in claim 1 wherein the transmission/reception light splitter includes a support structure which is substantially optically transparent over its cross section and which is positioned between the transmission/reception common lens and the light receiving element and on the optical axis of the transmission/reception common lens and within its focal plane and wherein the one optical fiber has its end which is proximal to the transmission/reception common lens mounted in the support structure.

5. An optical space transmission apparatus as recited in claim 4 wherein the support structure comprises an optically transparent plate.

6. An optical space transmission apparatus as recited in claim 4 wherein the support structure comprises a first ring and a second, larger diameter ring and a plurality of radially extending supports connecting the first ring to the second ring.

7. An optical space transmission apparatus as recited in claim 4 wherein the transmission/reception common lens is a compound lens.

* * * * *